March 21, 1967  W. LASAR  3,310,086
AUTOMATIC MEAT GRINDING APPARATUS
Filed Dec. 14, 1964  4 Sheets-Sheet 1
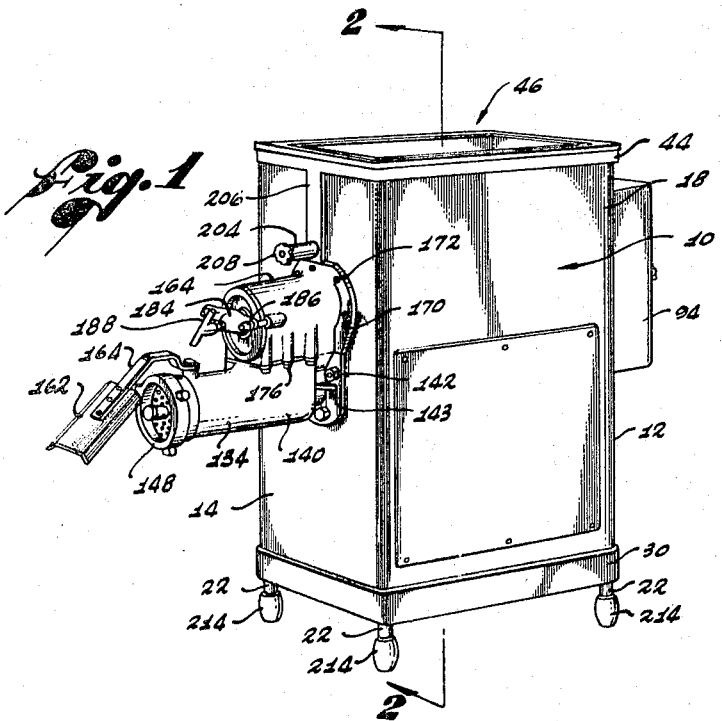
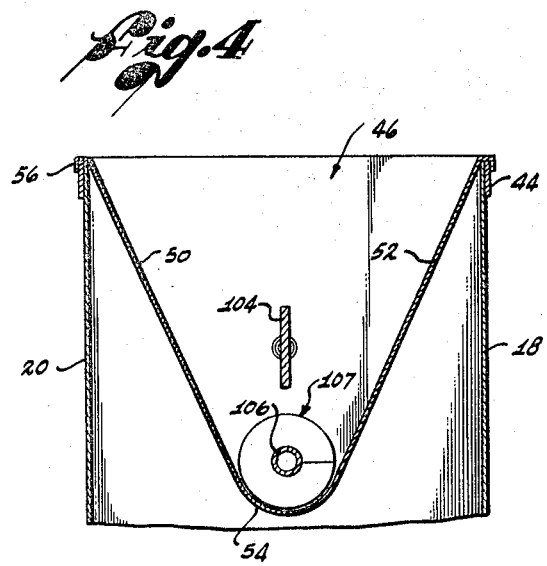
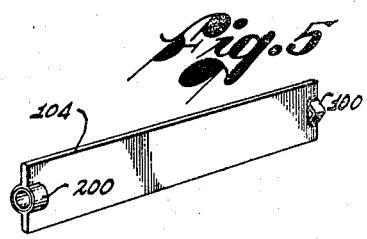
INVENTOR.
WILLIAM LASAR
BY Fulwider Patton Rieber,
Lee, and Utecht
ATTORNEYS

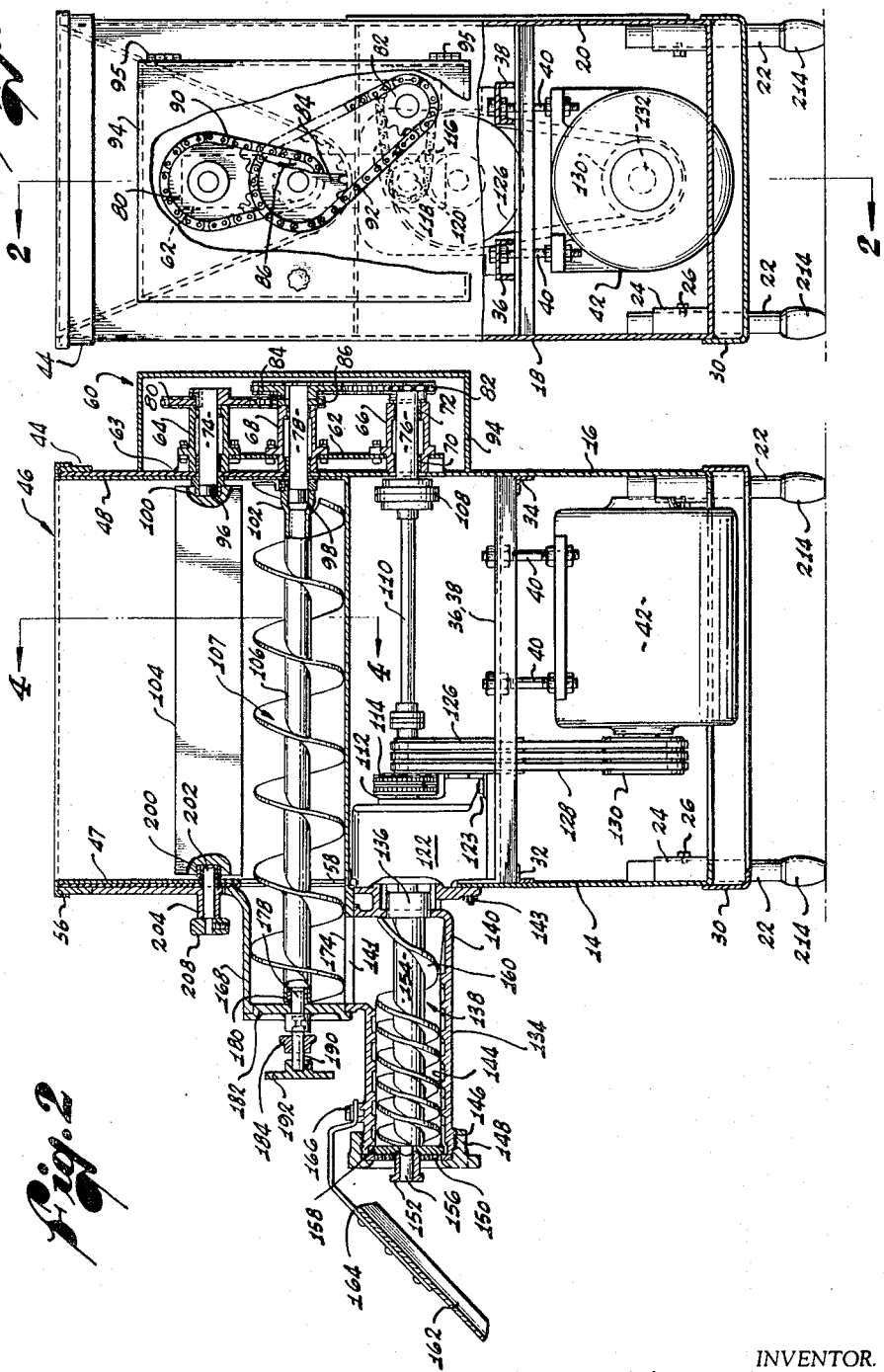

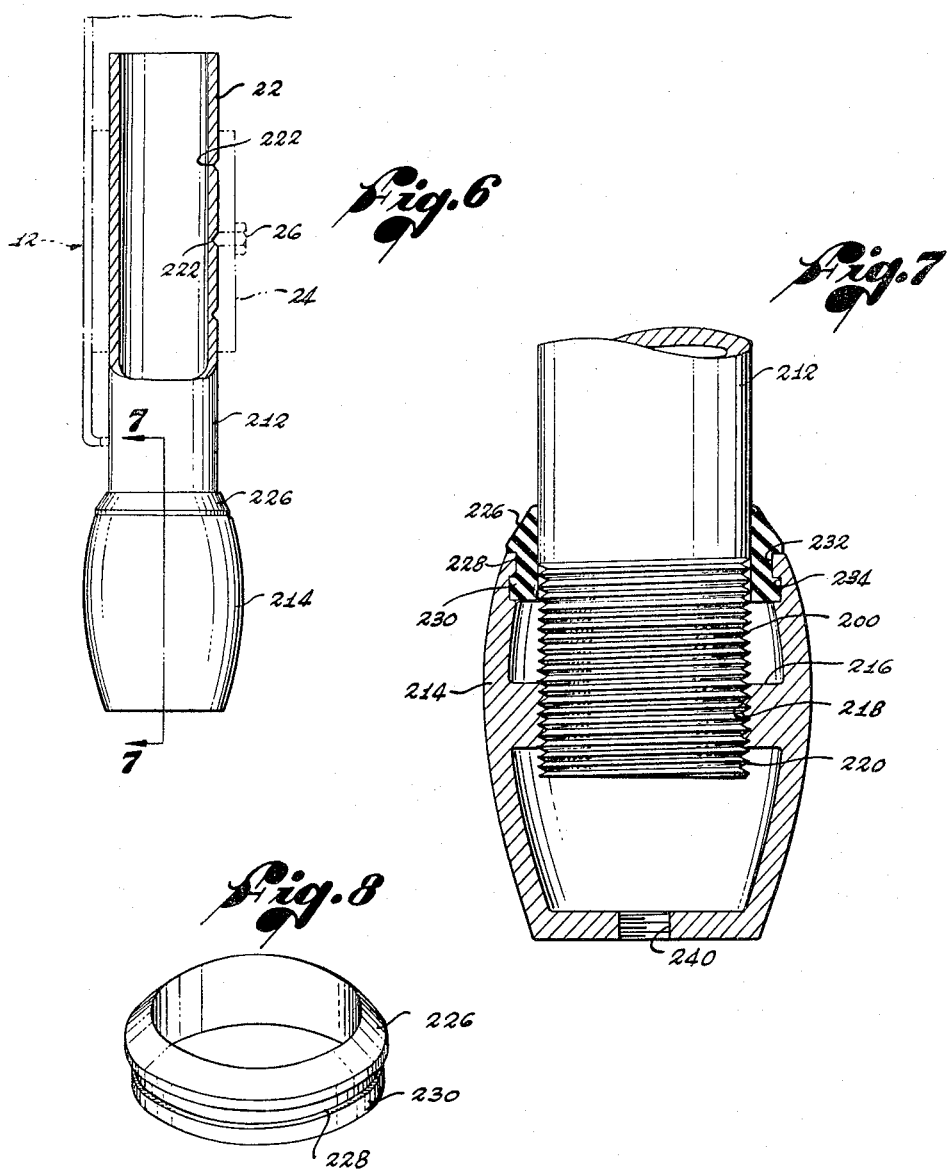

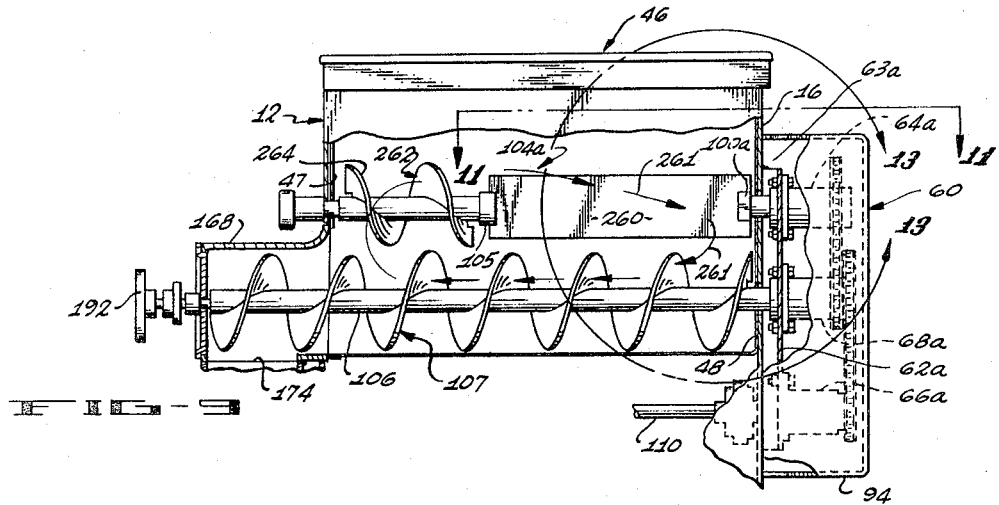
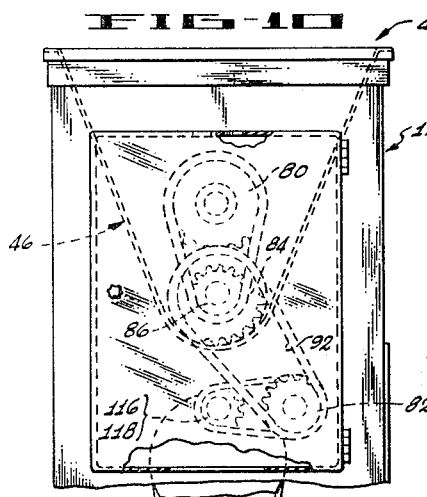
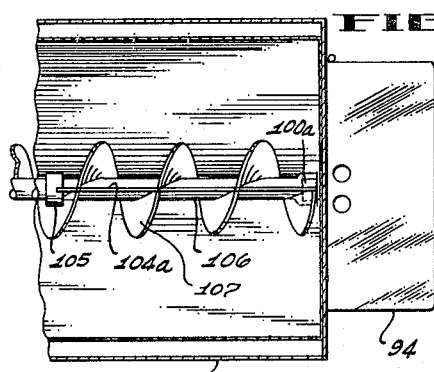
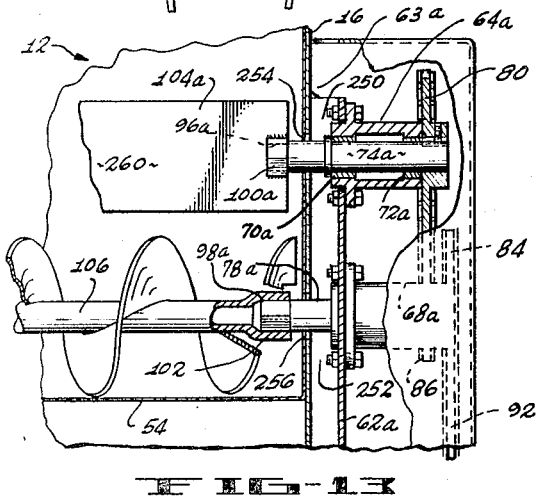
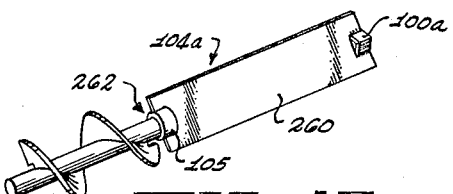
INVENTOR.
WILLIAM LASAR
BY Fulwider, Patton, Rieber,
Lee, and Utecht
ATTORNEYS United States Patent Office 3,310,086
Patented Mar. 21, 1967

3,310,086
AUTOMATIC MEAT GRINDING APPARATUS
William Lasar, 2540 E. 114th St.,
Los Angeles, Calif. 90059
Filed Dec. 14, 1964, Ser. No. 418,153
4 Claims. (Cl. 146—186)

This invention relate in general to food processing machines, and more particularly to power driven machines for grinding or chopping relatively large quantities of food, especially meat.

This application is a continuation-in-part of co-pending application Ser. No. 289,280, filed June 20, 1963, now abandoned.

Various kind of meat grinding machines have heretofore been employed for so-called chopping or grinding of meat which have presented a number of operating disadvantages. Usually, heretofore the meat to be ground has been loaded into a large stationary feed hopper, in suitably sized cuts or chunks, from which the meat passed under gravity into a power operated feed screw, which transported the chunks to a chopper knife and grinder die mechanism from which the ground meat extrudes into a suitable container. Heretofore, it has been found that the meat chunks placed in the meat hopper tend, after a brief operating period, to bridge over the hopper outlet and feed screw, causing a discontinuance of the feed of the meat by gravity into the feed screw. To overcome this difficulty, it has heretofore been necessary, either by hand or by means of a suitable pusher or stomper tool, to substantially continuously prod or push meat chunks downwardly within the hopper into the feed screw. Such manual feeding operations have not only resulted in inefficient operation, but have involved hazards to the operator and equipment.

It is, accordingly, an object of this invention to provide a grinding machine having improved means for feeding material to the grinder.

It is another object of this invention to provide a food grinding machine, which incorporates automatic means for continuous feeding of material to be ground into the feed screw.

It is a still further object of this invention to furnish a food grinding machine, which incorporates automatic features for safeguarding the operator against accident or injury in connection with its operation.

It is a still further object of this invention to provide a grinding device capable of grinding meat more rapidly and efficiently.

It is a still further object of this invention to provide a food material grinding device which incorporates constructional features for facilitating its maintenance in a clean and sanitary condition.

These and other objects, advantages, and features of novelty of this invention will be evident hereinafter.

In the drawings which illustrate a presently preferred embodiment of the invention:

FIGURE 1 is a perspective view of the general assembly of the grinder apparatus embodying the invention.

FIGURE 2 is a longitudinal, sectional view of the apparatus, as viewed on a vertical plane located approximately as indicated by line 2—2 in FIGURES 1 and 3.

FIGURE 3 is an end elevational view of FIGURE 2 with portions of the exterior covering removed to expose parts of the interior mechanism.

FIGURE 4 is a fragmentary cross sectional view taken on line 4—4 of FIGURE 2.

FIGURE 5 is a detailed view of the agitator plate portion of the mechanism of the invention contained within the feed hopper, as shown in FIGURES 2 and 4.

FIGURE 6 is an enlarged detailed view of the assembly of one of the adjustable chassis supporting legs including a floor bearing foot member portion thereof.

FIGURE 7 is an enlarged longitudinal sectional view taken on line 7—7 through the foot member of the leg apparatus of FIGURE 6.

FIGURE 8 is an enlarged perspective, detailed view of a portion of the foot member, shown in FIGURE 6 and 7.

FIGURE 9 is a fragmentary, longitudinal, sectional view of a portion of the apparatus shown in FIGURE 2, illustrating a modified construction of a portion thereof.

FIGURE 10 is a fragmentary, end elevational view of the apparatus of FIGURE 9.

FIGURE 11 is a fragmentary, longitudinal sectional view taken on a horizontal plane, as indicated by line 11—11 of FIGURE 9.

FIGURE 12 is a fragmentary, detailed, perspective view of a portion of the apparatus shown in FIGURES 9 and 11.

FIGURE 13 is an enlarged, fragmentary, vertical sectional detailed view of that portion of the apparatus enclosed within circle 13 of FIGURE 9.

Referring now to the drawings, and first mainly to FIGURES 1, 2, and 3 the grinder assembly is provided with a basic chassis, indicated generally at 10, consisting mainly of a rectangular cabinet 12 having forward and rearward vertical metal side walls 18 and 20, said cabinet being supported on four vertically adjustable legs, as shown at 22, the details of construction of such legs being best shown in FIGURES 6 and 7. The legs 22 are vertically adjustably fixed within tubular attachment members 24, which are fixed by suitable means, such as by gas or electric welding, to the inner surfaces of the lower corner portions of the cabinet 12. Set screws, as shown at 26, are threaded through the sides of each of the supporting tubular members 24 for adjustably fixing the vertical position of the leg members 22 within the tubular members 22 within the tubular members 24, as will be hereinafter more fully described.

The lower edge portion of the lower open end of the cabinet 12 has attached to it by suitable means, such as by gas or electric welding, a surrounding, rectangular shaped reinforcing angle frame 30, and the upper open end of the cabinet 12 has similarly attached to the outer marginal portion thereof a rectangular reinforcing frame member 44.

Within the interior of the cabinet 12, intermediate the upper and lower ends thereof, is a supporting frame work consisting of crosswise extending end angle members 32 and 34 attached to the forward and rearward end panels 14 and 16 of the cabinet 12, and a pair of lengthwise extending channel members 36 and 38, the ends of which are supported on the aforesaid angle members 32 and 34. Suspended by and below the channel members 36 and 38 by means of four vertically extending, lengthwise adjustable bolts, as shown at 40, is a prime mover for furnishing the driving power for the meat feeding, agitating, and grinding apparatus, such prime mover preferably being an electric motor, as shown at 42.

Seated upon the edges of the upper open end of the cabinet 12 and the surrounding rectangular reinforcing frame 44 and extending downwardly therefrom into the cabinet is a feed hopper, shown generally at 46. The feed hopper is approximately triangular in shape, as viewed in vertical cross section as shown in FIGURE 4, having a rectangular shaped open top with vertical opposite end walls 47 and 48 and downwardly convergingly sloping side walls 50 and 52 joining in a semi-cylindrical bottom apex portion, as shown at 54. The upper edges of the side and end walls of the feed hopper 46 are formed with outwardly and downwardly turned edges 56, which supportingly bear upon and hook over the upper edges of the cabinet end and side wall panels and frame work 44. One end wall 47 of the feed hopper 46 has a circular outlet opening 58 coaxial with and forming an extension of the projected semi-cylindrical bottom portion 54 and which registers with a correspondingly sized opening in the cabinet end panel 14.

Attached to the upper intermediate portion of the rear end panel 16 of the cabinet 12 is a chain drive assembly, shown generally at 60, which comprises a channel-shaped spindle shaft carrier member 62 attached to the exterior of the rear end panel 16 by suitable means, such as by gas or electric welding of the edges of the channel legs thereto, as shown at 63, and which carries bolted thereto three generally cylindrical spindle bearings assemblies, comprising an uppermost agitator shaft spindle bearing housing 64, a lowermost jack shaft spindle bearing housing 66, and a feed screw shaft spindle bearing housing 68. Each of the beforementioned spindle bearing housings carries adjacent the inner and outer ends thereof bearing bushings, as shown for example, at 70 and 72 in the housing 66.

Rotatably journaled in the bearing assemblies comprised of the housings, 64, 66 and 68, respectively, are an agitator drive spindle 74, a jack shaft driven spindle 76, and a feed screw drive spindle 78. Fixed to the outer end of the respective spindles 74 and 76 are chain sprockets 80 and 82, and fixed to the outer end portion of spindle 78 are a pair of end-to-end positioned chain sprockets 84 and 86. Sprockets 80 and 86 are drivingly inter-connected by a chain 90 and sprockets 84 and 82 are drivingly interconnected by chain 92, the number of the teeth on sprocket 82 being less than that on sprocket 84, and the number of teeth on sprocket 86 being less than on sprocket 80, such that the drive ratios between the spindles 76, 78 and 74 are stepwise respectively greater, resulting in corresponding stepwise reductions in rotational speeds.

Spindles 74 and 78 extend from the before described bearing housings 64 and 68 a short distance into the feed hopper through correspondingly sized holes formed through the cabinet rear panel 16 and the feed hopper end wall 48. The inner ends of the spindles 74 and 78 are formed with squared end portions 96 and 98, respectively, which make axially slidably detachable fits with corresponding square sectioned drive sockets 100 and 102, respectively, provided in the ends of a rotatable agitator member 104 and a feed screw shaft 106, of a spiral vaned hopper feed screw 107, which will be more fully described hereinafter. The inner end of spindle 76, which extends into the cabinet 12 through a correspondingly sized hole formed in the rear panel 16 is drivingly coupled through a torque limiting slip clutch 108 to the adjacent end of a horizontal jack shaft 110 which is, in turn, rotatably supported at its opposite end in a bearing means, partially shown at 112. The hereinbefore described spindle bearing carrier assembly 62 and the associated spindles, sprockets, and interconnecting chain drives is enclosed within a cover box 94 hinged to the rear panel 16 of the cabinet 12 by hinges, as shown at 95.

Fixed on the opposite end portion of the jack shaft 110 adjacent the bearing means 112 is a double chain sprocket 114, which is drivingly connected by means of double chain 118 to a double chain sprocket 116, which is fixed to one end of the output shaft 120 of a gear reduction unit 122. The gear reduction unit 122 is supported within the cabinet 12 upon and is bolted at several points, as shown at 123, to the upper surface of the before-described supporting frame work channel members 32 and 34 and also through the cabinet wall to grinder housing 140. Fixed to the end of the input drive shaft 124 of the gear reduction unit 122 is a multiple grooved belt pulley 126 which is, in turn, drivingly coupled by belts 128 to a corresponding drive pulley 130 fixed on the end of the armature shaft 132 of the before-mentioned prime mover electric motor 42. The sizes of the belt pulleys 126 and 128 and the sprockets 116 and 114 are such, as shown in the drawings to result in a stepwise reduction in the drive speeds from the motor armature shaft to the respective input drive to the gear reduction unit 122 and from the output of the gear reduction unit 122 to the jack shaft 110.

Coupled to the other end of the before-mentioned output shaft 120 of the gear reduction unit 122 by means of an axially slidably, detachable coupling means 136 is a coaxial, spiral vaned grinder feed screw 138 which is rotatably contained in a generally L-shaped grinder housing 140 which is, in turn, attached to the outer face of the cabinet forward end panel 14 by means of stud bolts 142 which pass through flange 143, panel 14 and into the adjacent face of the housing of the gear reduction unit 122.

The grinder housing 140 is formed with an outer, coaxially extending, generally cylindrical casing portion 134, internally spiral grooved, as shown at 144, and provided at the outermost end with external threads 146, to which an internally threaded grinder die retainer cap 148 is detachably threadedly connected. The retainer cap 148 serves to retain a perforated grinder die element 150 seated coaxially against the outer end of the grinder casing portion 134.

The grinder die is formed with an integral, central tubular hub 152, which serves as a removable outboard bearing for rotatably supporting the outer end of the grinder feed screw 138, the grinder feed screw body 154 being provided with a small, reduced diameter and pintle shaft extension 156, which extends rotatably into the hub 152. Retained on a square portion of the pintle shaft 156 intermediate the die element 150 and the adjacent end of the grinder feed screw body 154 and rotatable with such pintle and feed screw, is a star shaped chopper knife element 158 having a plurality of radially extending knife arms which rotate in contact with the inside surface of the die element 150 in conventional manner to chop the material extruding forced into the perforation of the die element, into suitable lengths. The body 154 of the grinder feed screw 148 is provided with an integrally formed spiral vane or thread 160 which results, in cooperation with the internal spiral grooves 144 of the casing portion 134, in forcing the feed material therein under pressure toward the die element 150 and chopper knife element 158 when rotated in a clockwise direction, as viewed from the inner end thereof, carrying the coupling means 136.

A spurt guard 162 is adjustably supported at an angle opposite the outlet end of the grinder casing 134 and die element 150 by means of a bracket 164 bolted at 166 to a boss formed on the upper side of the grinder casing portion 134 of the grinder housing 140.

Fastened to the exterior of the forward panel 14 of the cabinet 12 immediately above the grinder housing 140 and coaxially communicating with the feed hopper outlet 58 is a generally cylindrical shaped hopper outlet fitting 168, which serves as a compression chamber as hereinafter more fully described. The hopper outlet fitting 168 has an inside bore coaxial with and having an inside diameter substantially equal to the projected diameter of the semicylindrical bottom inverted apex portion 54 of the feed hopper 46, and is also formed with an inner and attachment flange portion 170, as best shown in FIGURE 1, by means of which it is supportingly bolted to the panel 14 by means of a plurality of bolts or machine screws, as shown in 172. The hopper outlet fitting 168 is also formed with a downwardly facing outlet opening 174 therein, which is coupled into communication with the before mentioned upwardly facing inlet opening 141 of the grinder housing 140 by means of a plurality of stud bolts, as shown at 176.

The forward or discharging end of the before mentioned hopper feed screw 107 extends coaxially into the bore of the outlet fitting 168 and is rotatably supported at its outer end upon a short, stationary pivot pin 178.

the inner end of which extends into a bearing contained in a cylindrical socket 180 formed in the adjacent end of the shaft portion 106 of the feed screw 107. The effective outside diameter of the spiral vane of the feed screw 107 is made only slightly less than the inside diameter of the said bore of the outlet fitting 168. The pivot pin 178 is supported by and extends from the outer of a closure cap 182 which detachably fits on the outer end of the bore of the outlet fitting 168. The closure cap 182 is detachably held in sealing engagement with the end of the outlet fitting 168 by means of an attachment mechanism, which comprises a cross yoke member 184, the opposite outer end portions of which make detachable connection with the outer ends of a pair of bolts 186 and 188, which extend axially from bosses formed integrally on diametrically opposite sides of the outlet fitting 168, and the central portion of which makes threaded connection with a central hand screw 190. The inner end of the hand screw 190 makes connection with a central hub portion of the cap closure member 182 in such a manner as to be immovable axially, but free to rotate relative thereto, whereby upon rotation of the screw 190 by means of handle 192 the cap 182 may be either forced axially into firm sealing engagement against the end of the outlet fitting 168 or released therefrom.

Rotatably supported within the hopper 46 a short distance above and parallel with the feed screw 107 as shown in FIGURE 2, is the hereinbefore mentioned agiator member 104. The right hand end of the agitator member 104, as viewed in FIGURES 2 and 5 is provided with the beforementioned square sectioned drive socket 100, which makes driving and supporting engagement with the inner end of spindle 74. The end of the agitator member 104 opposite the socket 100 is provided with a coaxial bearing collar 200 containing a bearing bushing which is rotatably supported upon the inwardly extending end of a coaxial, normally stationary pivot pin 202. The pivot pin 202 is threaded through a supporting collar 204 which is fixed to the outer face of the cabinet panel 14 by means of an integral attachment bar 206 which extends vertically and is attached at its upper end to the frame 44. The outer end of the pivot pin 202 may be screwed into or removed from collar 204, whereby it may be extended into or withdrawn from the bearing collar 200 for supporting or freeing the adjacent end of the agitator member 104 for removal thereof from the hopper 46, when desired.

Reference is next made primarily to FIGURES 9–13 inclusive, in which a modified version of a portion of the hereinbefore described apparatus is shown.

Attached to the upper intermediate portion of the rear end panel 16 of the cabinet 12 is a chain drive assembly, shown generally at 60a, and which is similar to that shown generally at 60 in FIGURE 2, except for modifications in construction which are hereinafter described.

The modified chain drive assembly 60a comprises a channel-shaped spindle shaft carrier member 62a attached to the exterior of the rear end panel 16 by suitable means, such as by gas or electric welding of the edges of the channel legs thereto, as illustrated at 63a, and which carries, bolted thereto, three generally cylindrial spindle bearing assemblies, comprising an uppermost agitator shaft spindle bearing housing 64a, a lowermost jack shaft spindle bearing housing 66a, and a feed screw shaft spindle bearing housing 68a. Each of the beforementioned spindle bearing housings 64a, 66a and 68a carries adjacent the inner and outer ends thereof, bearing bushings, as best shown in FIGURE 13, for example at 70a and 72a in the housing 64a. These spindle bearing housings and the inner bearing bushings contained therein, instead of being positioned with the inner ends thereof closely adjacent to or in abutment with the outer surface of the rear end panel 16 of the cabinet 12, as shown in FIGURE 2, are spaced apart therefrom a short distance as best shown at 250 and 252 in FIGURE 13.

Rotatably journaled in the bearing assemblies comprising the housings 64a and 68a respectively, are an agitator drive spindle 74a and a feed screw drive spindle 78a, which are similar to the agitator drive spindle 74 and feed screw drive spindle 78, hereinbefore described in connection with FIGURE 2. Fixed to the outer end of the agitator drive spindle 74 is chain sprocket 80, and fixed to the outer end portion of the feed screw drive spindle 78 are chain sprockets 84 and 86. Sprockets 80 and 86 are drivingly interconnected by chain 90 and sprockets 84 and 82 are drivingly interconnected by chain 92, such sprockets and chains being the same as those hereinbefore described in connection with FIGURES 2 and 3.

Spindles 74a and 78a extend endwise from the beforedescribed bearing housings 64a and 68a, a short distance into the interior of the feed hopper 46 through coaxial entrance holes 254 and 256 respectively formed through the cabinet rear panel 16 and the feed hopper end wall 48. These entrance holes 254 and 256 are of large inside diameter relative to the outside diameter of the spindles 74a and 78a, thereby providing relatively large annular clearance spaces therebetween. Such annular clearance spaces are for the purpose of minimizing the tendency for accumulation therein and to facilitate the cleaning therefrom of remnants or residue of the food materials placed in the feed hopper 46 for grinding. The maintenance of the feed hopper and the drive mechanisms in sanitary condition is thereby enhanced.

The inner ends of the spindles 74a and 78a are formed with squared end portions 96a and 98a respectively, which make axially slidably detachable coupling fits within the corresponding square sectioned drive sockets 100a and 102, provided in the ends of rotatable agitator member 104a and feed screw shaft 106 of the spiral vaned feed screw 107. The feed screw 107 and its shaft are constructed in the same manner as thereinbefore described in connection with FIGURES 2 and 3, but the agitator member 104 is of modified construction, as hereinafter described.

Rotatably supported within the hopper 46 a short distance above and parallel with the feed screw 107, is the beforementioned agitator member shown generally at 104a. This agitator member 104a, is similar in construction to that of the beforedescribed agitator member 104, except that instead of employing a single rectangular agitator plate member, it is constructed with two separate portions joined coaxially end-to-end, as shown at 105, one portion thereof being formed of a rectangular plate member as shown at 260 and the other portion consisting of a spiral screw as shown at 262. The agitator screw 262 is formed with an integrally formed, or otherwise suitably attached, spiral vane or thread 264, similar to that employed by feed screw 107 except it has a lead which is opposite to that of the hopper feed screw 107, whereby upon rotation thereof in normal operation, the contents of the upper portion of the hopper 46 tends to be moved thereby horizontally towards the agitator portion 260 and in a direction opposite to that of the contents of the lower portion of the hopper. The righthand end of the agitator plate portion 260, as viewed in FIGURES 9 and 13, is provided with the beforementioned square sectioned drive socket 100a, which makes driving and supporting engagement with the square inner-end of spindle 74a. The opposite end of the spiral screw portion 262 of the agitator member 104a opposite the socket 100a is provided with a coaxial bearing collar 200, containing a bearing bushing which is rotatably supported within the inwardly extending end of a stationary pivot pin 202. The pivot pin 202 is fitted through a supporting collar 204, which is in turn, fixed to the outer face of the cabinet panel 14, by means of an integral attachment bar 206, which extends vertically and is attached to the frame 44, all in the same manner as hereinbefore described in connection with apparatus of FIGURES 2 and 3. The agitator member 104a may, when desired, be thus removed from the hopper 46 in the same manner as hereinbefore described in connection with the agitator member 104.

Referring next primarily to FIGURES 6–8 inclusive, as hereinbefore mentioned, the cabinet 12 is supported on four vertically adjustable legs, as shown at 22, whereby the grinder assembly 10 may be precisely adjusted to a level position in accommodation to any reasonable irregularities in contour or slope of the underlying supporting surface. The supporting legs 22 comprise a tubular upright member 212, to the lower end of which is threadedly connected a generally cylindrical shaped, flat bottomed hollow foot member 214. The foot member 214, is formed with an internal, intermediately located annular flange or diaphragm portion 216, which is internally threaded, as shown at 218, and which received the externally threaded lower end portion 220 of the upright member 212. By rotation of the upright member 212 and the foot member 214 relative to one another a fine adjustment of the length of the leg assembly may be accomplished over a length range determined by the length of the threaded lower end portion 220.

The upright member 212 of the leg 22 is provided with a plurality of external, longitudinally spaced apart indentations, as shown at 222, for receiving the inner end of the beforementioned set screw 26 which threadedly extends through the tubular supporting member 24. The spacing of the indentations is each preferably slightly less than the range of length adjustment provided by the threaded lower end portion 220 of the upright member 212. By positioning the set screw 26 selectively in such indentations 222 in the upright portion 212, a large or rough adjustment of the length of extension of the leg 22 below the cabinet 12 may be accomplished. By means of a combination of the rough length adjustment, as provided by the set screw 26, and the indentations 222 and the fine length adjustment, as provided by the screwed adjustment means incorporated in the foot member 214, as hereinbefore described, a continuously variable adjustment of the length of the leg 22 may be accomplished.

Contained in the upper end portion of the foot member 214 is a generally annular seal member 226 composed of a resilient material, preferably an elastomer such as rubber or neoprene. The seal member 226 is formed with an outwardly facing annular groove 228 and an adjacent outwardly facing annular bead 230, which make retaining engagement with an inwardly facing annular groove 234, respectively, formed adjacent the upper end of the foot member 214. The bore of the annular seal member 226 is formed with an inside diameter normally slightly less than the outside diameter of the upright member 212, whereby frictional gripping engagement is effected between the foot member 214 and the upright member 212 which permits but offers a reasonably strong resistance to the rotation of the foot member 214 and upright member 212 relative to one another. The bottom of the foot member 214 is provided with a centrally located, internally threaded hole 240 for attaching, if desired, a suitable caster or glider member.

In the assembhly of each of the legs 22, the annular seal member 226 is first inserted and snapped into place within the upper end of the foot member 240, after which the upright member 212 is forceably inserted through the bore of the annular seal member 226 into threaded engagement with the hereinbefore described internally threaded portion of the foot member 214. The annular seal member 226 thus not only serves as a lock means to prevent inadvertent rotation of the upright member 212 and foot member 214 of the leg 22 relative to one another, but also serves as a seal to prevent the entrance of extraneous material into the foot member, which might otherwise find its way down to the leg from the grinder and into the hollow foot member 214. This latter feature is important in connection with food machinery of the kind hereinbefore described, because it has an important bearing upon the facility and effectiveness with which the apparatus may be maintained in adequately clean sanitary conditions.

The operation of the apparatus of the present invention is briefly as follows.

Upon energization of the electric motor 42, the grinder feed screw 138, hopper feed screw 107, and the agitator member 104 are set into rotation through the hereinbefore described drive mechanism, the rotational speed thereof being of reduced value in the order named. The gear ratio of the drive mechanism is such that with an electric drive motor 42 having a speed of approximately 1800 r.p.m., the rotational speeds of the grinder feed screw 138, hopper feed screw 106, 107, and agitator member 104 will be approximately 270, 40 and 20 r.p.m., respectively.

Upon setting the grinder mechanism into operation, as beforementioned, a load of meat cuts or chunks to be ground is dumped into the feed hopper 46, whereupon it gravitates and circulates downwardly past the agitator means 104 or 104a and into the spiral turns of the hopper feed screw 107 and thence by reason of the rotation of the hopper feed screw 107, it is transported along the semi-cylindrically shaped bottom 54 of the hopper 46 and introduced into the hopper outlet fitting 168, where it is placed under considerable pressure exerted by the action of the hopper feed screw 107. The outlet fitting 168 thus serves as a compression chamber in which the meat chunk material is placed under considerable initial pressure. From the compression chamber 168, the material flows into the opening 141 of the grinder housing 140. From the inlet opening 141 in the grinder housing 140, the meat chunks are forced under pressure into the spiral turns of the grinder feed screw 138 and by reason of its rotation are forced toward the grinder die 150 and chopper knife 158 under still further increased pressure sufficient to be extruded through the perforations in the grinder die 150, with cutting or chopping of such extrusions as they emerge from the exterior of the grinder die by the rotating chopper knife 158.

During such operations, the agitator member 104 or 104a, by reason of the rotation thereof, constantly agitates the load of meat chunks contained in the hopper 46 above the hopper feed screw 107, thereby preventing it from bridging over the hopper feed screw 107, and thereby preventing the hopper feed screw 107, in effect, from channelling through the meat load without transporting it along the bottom of the hopper toward the outlet fitting 168. Similarly, in operation, the screw portion 262 of the modified agitator 104a shown in FIGURE 9, acts not only to agitate the load of meat but also to move the upper portion of the body of meat chunks horizontally toward the agitator plate member 260, and thus tends to set up a circulatory movement therein, generally following the path indicated by arrows 261, which results in a more efficient and complete movement mixture and feed of the meat, such circulatory movement being first from the screw portion 262 to the agitator plate portion 260 thereof, and thence down to the feed screw 107 with the excess material not carried by the feed screw into the outlet fitting 168 returning upwardly to the agitator screw 262. The ground meat, which is extruded through the perforations of the grinder die 150, is allowed to fall therefrom into a suitable container positioned therebelow (not shown).

When it is desired to remove the grinder mechanism including the grinder feed screw 138, chopper knife 158, and die grinder 150 and also to remove the hopper feed screw 107 and the agitator member 104 or 104a for cleaning or repair purposes, it is only necessary to remove the grinder die retainer cap 148 from the grinder casing portion 134, whereupon the grinder feed screw 138 and its aforesaid associated mechanism can be withdrawn axially entirely from the housing 140, thus being permitted by reason of the detachable coupling means 136 between the grinder feed screw body 154 and the output shaft of the speed reducer 122.

Similarly, by unscrewing the hand screw 190 by means of the handle 192 from the yoke member 184, the closure cap 182 may be released from the outer end of the hopper outlet fitting 168, after which the hopper feed screw 107 may be withdrawn therefrom, such withdrawal being permitted by the hereinbefore described detachable coupling 98, 102 between the lead screw shaft 106 and the feed screw drive spindle 78.

Similarly, the agitator member 104 or 104a may be removed from the hopper 46 by screwing the pivot pin 202 outwardly within the supporting collar 204 until the inner end thereof clears the coaxial bearing collar 200 in the left hand end of the agitator member 104 and 104a, whereupon the agitator 104 or 104a may be moved axially sufficiently to uncouple the drive socket 100 or 100a from the squared end of the agitator drive spindle 74 or 74a, after which the agitator member 104 or 104a may be lifted upwardly out of the hopper 46. With the agitator member 104 or 104a thus removed, the hopper 46 may be lifted upwardly out of the upper end of the cabinet.

An important feature of this invention resides in the hereinbefore described operation of the apparatus, which constitutes in effect a three stage grinder feed system in which the pressure of the meat fed to the final grinding mechanism is applied in three stages which is initiated by the first agitator stage within the feed hopper 47, is raised to a first pressure stage in the compression chamber fitting 168 by the first feed screw and is raised to a second higher pressure stage in the grinder housing 140 by the second feed screw means 138.

Another important feature, hereinbefore described, is the provision for limiting the torque applied to the first feed screw means 107 by a slip coupling such that in event the flow of the material therefrom to and through the second feed screw means and grinder does not keep up with the supply, the feed screw can run at a reduced speed whereby excessive pressure is prevented from building up in the feed screw compression chamber fitting 168, and excessive stress in the feed screw and associated drive mechanism is also thereby limited to safe values. Another important feature, as hereinbefore mentioned, is the automatic agitation of the contents of the feed hopper, whereby constant agitation, circulation, mixture and uniform feed is maintained, and the hazards of manual agitation or pushing methods are eliminated.

It is to be understood that the foregoing is illustrative only and that the invention is not limited thereby, but may include various modifications and changes made by those skilled in the art within the scope of the invention, as defined in the appended claims.

What is claimed is:
1. A food material grinder, comprising:
a feed hopper that receives food to be ground;
a compression chamber axially extending from one side of the bottom portion of said feed hopper;
a first horizontal rotatable feed screw in the bottom portion of said feed hopper and extending into said compression chamber;
a second horizontal feed screw parallel to said first feed screw having an inlet portion and a discharge portion;
closed connector means extending radially from said compression chamber into the inlet portion of said second feed screw;
grinder means connected to the discharge portion of said second feed screw means;
an elongated horizontal agitator rotatably supported in said feed hopper adjacent to the upper portion of said first feed screw;
and power means for simultaneously driving said first and second feed screws and said agitator member, with rotation of said agitator preventing said food from bridging over said first feed screw, and rotation of said first feed screw forcing said food through said compression chamber and connector means under pressure into the inlet portion of said second feed screw.

2. A food material grinder as set forth in claim 1 wherein means are interposed between said power means and said first feed screw for limiting the driving torque applied to said first feed screw to a predetermined maximum value.

3. A food material grinder as set forth in claim 1 wherein said agitator comprises an elongated plate portion and a spiral vaned screw portion, said plate portion and said screw portion being attached together in coaxial end-to-end relation for simultaneous rotation about said horizontal axis.

4. A food material grinder as set forth in claim 3 wherein the lead of said spiral vaned portion of said agitator and said first rotatable feed screw and the said drive means therefor is such as to tend to move material in said hopper by said spiral vaned portion of said agitator in a direction opposite to that moved by said first rotatable feed screw.

References Cited by the Examiner

UNITED STATES PATENTS

| | | | |
|---|---|---|---|
| 1,209,790 | 12/1916 | Woodcock | 241—247 X |
| 1,297,766 | 3/1919 | Willard | 146—181 X |
| 2,462,542 | 2/1949 | Paetow. | |
| 2,661,040 | 12/1953 | Guldenring | 146—181 |
| 3,054,431 | 9/1962 | Hartley et al. | 146—186 X |
| 3,137,334 | 6/1964 | Steele | 146—192 |

FOREIGN PATENTS

| | | |
|---|---|---|
| 471,608 | 2/1929 | Germany. |
| 643,735 | 4/1937 | Germany. |
| 1,078,892 | 3/1960 | Germany. |
| 303,406 | 12/1932 | Italy. |

WILLIAM W. DYER, JR., *Primary Examiner.*

W. GRAYDON ABERCROMBIE, *Examiner.*